2,976,265
PROCESS FOR PREPARING EPOXIDE COMPOSITIONS USING A DEHYDRATED ACID CATION EXCHANGE RESIN CATALYST

John W. Pearce, Racine, Wis., assignor to S. C. Johnson & Son, Inc., Racine, Wis.

No Drawing. Filed Apr. 26, 1955, Ser. No. 504,096

6 Claims. (Cl. 260—75)

This invention relates to an improved process for preparing epoxide compositions from unsaturated organic compositions. Epoxidation processes are widely used currently in the epoxidation of the unsaturated by-products of the fat and soap industry, as well as in the epoxidation of unsaturated oil products such as the corn, cottonseed, and soyabean oils. Epoxide compositions are valuable as plasticizers and resin stabilizers, and as intermediates in the production of other products derived by polymerization reactions with the reactive epoxide group present in epoxide compositions. These polymerization products are extremely useful in the production of molded articles, adhesives, flexible films, etc.

One general method to epoxidize unsaturated compounds has involved the use of hydrogen peroxide, which is a mild oxidizing agent. The hydrogen peroxide, when used in conjunction with an organic acid, transforms the organic acid to an organic peracid, and the peracid reacts with the unsaturated compounds to form epoxide compositions. Organic acids which have been used in this manner with hydrogen peroxide are such acids as benzoic acid, formic acid, and acetic acid.

In the epoxidation of these unsaturated compounds, difficulty has been encountered in separating the epoxide product from the reaction mixture. Many of these unsaturated organic materials are quite insoluble in water. In the epoxidation of these compositions with peracetic acid for instance, it has been a practice to prepare a concentrated peracetic acid solution from hydrogen peroxide and acetic anhydride, the resulting peracetic acid solution being sufficiently free of water to dissolve the unsaturated organic material. In separating the epoxide from the reaction mixture, water is added so that the reaction mixture separates into two phases. Since this method requires the use of the acid anhydride, the process involves considerable expense in the recovery of the acid from the reaction mixture.

It is possible to prepare these epoxide compositions using a peracid solution prepared from the wet form of an organic acid and hydrogen peroxide. For instance, the peracetic acid solution prepared from glacial acetic acid and hydrogen peroxide in the presence of a mineral acid catalyst such as sulfuric acid can be used in the epoxidation of unsaturated compounds. In this instance, the water introduced in the hydrogen peroxide solution and the water formed in the reaction of hydrogen peroxide with acetic acid to form the peracid dilutes the peracid solution so that the peracid solution is immiscible with most unsaturated organic materials. If the reaction mixture is agitated vigorously, in some instances, fairly good yields of an epoxidized product are obtained. Since the acid catalyst used in the peracid formation tends to attack the epoxide under the conditions used for epoxidation, the organic peracid is frequently preformed and the catalyst neutralized before the epoxidation reaction takes place.

More recently there has been developed a processing method consisting of epoxidizing olefins such as the unsaturated glycerides with a peracid formed by the reaction of hydrogen peroxide and an organic acid in the presence of a wet acid form of cation exchange resins of the sulfonated styrene-divinylbenzene copolymer type. The wet acid form of the cation exchange resin acts as a catalyst in the reaction of hydrogen peroxide and the acid to form the peracid. The use of the cation exchange resin as a catalyst permits the peracid to be formed in situ with the unsaturated organic compounds and still give fairly large yields, without the breakdown of the epoxide compounds which would normally occur if a mineral acid catalyst such as sulfuric acid were present in the epoxidation mixture. When the peracid is preformed, the use of an exchange resin facilitates the separation of the resin catalyst from the peracid solution prior to its use in the epoxidation reaction.

Commercial cation exchange resins of the sulfonated styrenedivinylbenzene copolymer, such as Dowex 50 (Dow Chemical Company) and Amberlite IR-120 (Rohm and Haas Company) are usually purchased commercially as the alkali salt form. This product is converted to the wet acid form by treating the exchange resin with a mineral acid, such as hydrochloric acid, followed by washing with water to remove the excess mineral acid and inorganic salt.

While the methods described above give fairly good yields of epoxidation in certain instances, it has been found that in the case of organic compounds which are somewhat hydrophilic, relatively low yields of epoxidation result and separation of the epoxide product from the reaction mixture becomes quite difficult when water in any appreciable amount is present in the reaction mixture. Difficulties in separating the epoxide product are encountered due to the water which becomes emulsified in the epoxide product. The decrease in yield is apparently due to the hydrophilic nature of the composition enabling hydrolysis of the epoxide groups to the corresponding glycols and reaction with residual free acid as epoxidation takes place.

It is, therefore, an object of this invention to provide an improved process for the epoxidation of unsaturated organic compounds.

It is another object of this invention to provide an improved process for the epoxidation of unsaturated organic compounds which utilizes a peracid formed by the reaction of hydrogen peroxide and an organic acid.

Still another object of this invention is to provide an improved process for preparing a peracid solution which may be used in the epoxidation of hydrophilic unsaturated organic compounds.

The foregoing and other objects and advantages are attained by the present invention, various novel features of which will become more fully apparent from the following description, with particular reference to specific examples which are to be considered as illustrative only.

As discussed hereinbefore, cation exchange resins of the sulfonated styrene-divinylbenzene copolymer type are obtained commercially in the wet form as the alkali salt. To convert these cation exchange resins to the wet acid form, the resins are washed with a mineral acid, such as hydrochloric acid; and then washed with water to remove the salt formed in the neutralization process.

In the wet form, these cation exchange resins contain up to 45% or more water depending on the crosslinkage which has been built into the exchange resin. The degree of crosslinkage in the cation exchange resin is usually controlled by varying the fraction of divinylbenzene the copolymer contains. The divinylbenzene contributes the third dimension to the polymer network of the cation exchange resin, and makes the resin insoluble. When a cation exchange resin contains a relatively large fraction of divinylbenzene, the resin is quite tightly crosslinked so that water and other material does not easily enter the resin network. Resins which have only a slight degree of crosslinkage are free to take up many times their weight of water and swell into a jelly-like mass.

Fairly good yields of epoxidation are obtained when the wet acid form of a cation exchange resin is used in the epoxidation of hydrophobic compositions such as the drying oils, unsaturated glyceride by-products of the fat industry, and simple aliphatic esters of unsaturated 18 carbon acids, such as ethyl or butyl-oleates.

It has been found that when slightly hydrophilic materials, such as oil-modified alkyd resins which are essentially mixed esters of dibasic acids and unsaturated acids of 18 to 22 carbon length with polyhydric alcohols such as glycerol and pentaerythritol, are epoxidized, and a wet acid form of a cation exchange resin is used in the peracid formation, only moderate yields of epoxidation are available. With more hydrophilic compositions, such as polyesters of tetrahydrophthalic acid and glycols, very low yields of epoxidation result when a wet acid form of resin is used. Separation of the epoxidized products from the reaction mixture becomes increasingly difficult as the hydrophilic nature of the epoxide composition increases, since the epoxide product tends to become emulsified with water.

In general, the improved process comprises epoxidizing unsaturated organic compounds with an organic peracid solution formed by reacting hydrogen peroxide with an organic acid in the presence of a dehydrated acid form of a cation exchange resin. The exchange resin acts as a catalyst in the reaction of hydrogen peroxide and the acid to form a peracid. When a dehydrated form of the exchange resin is used, the resulting peracid solution is sufficiently free of water so that the epoxide product formed using the peracid solution is essentially free of emulsified water, and quite good yields of the epoxide product may be obtained. This is apparently due to the dehydrating action of the resin which acts as a desiccant in the peracid solution. The water introduced into the solution with the hydrogen peroxide, and the water produced in the reaction of hydrogen peroxide and the organic acid to form a peracid, is thus effectively removed from the peracid solution. The ability of the resin to preferentially remove water may well be due to the sulfonic acid groups present in the cation exchange resin which tend to hold the water present, and the relative ease with which the small water molecule may enter the resin network.

In practice of the new process, the washed wet acid form of a cation exchange resin is dehydrated conveniently by placing the resin in a vacuum oven for a period of several hours at temperatures of around 75–110° C. After using the anhydrous acid form of the resin in an epoxidation process, it may be dehydrated again in a vacuum oven, making it ready for reuse. It has been observed that these cation exchange resins may be reused in this manner many times. For example, resins have been dehydrated and reused well over 20 times. Whether the process of epoxidation be a batch or a continuous process, the amount of water absorbed in the resin determines when the resin should be dehydrated again. It is possible, for instance, that a dehydrated resin might be used in the preparation of two or more batches of material before its efficiency is judged to be such as to justify redehydration. In a continuous process the operation would need to be discontinued when the resin has become sufficiently hydrated to require redehydration.

Use of a dehydrated cation exchange resin permits the formation of a relatively concentrated peracid solution without the necessity of using an anhydrous form of an organic acid in the reaction with hydrogen peroxide. When the dehydrated resin is used as a catalyst, it may be readily removed from the peracid solution if it is desired to perform the peracid solution prior to epoxidation of the unsaturated organic compounds.

The herein described process is particularly applicable to epoxidation processes where the peracid is formed in situ with the unsaturated organic compounds, that is, where the peracid is formed and used in the presence of the material to be epoxidized. It has been found that the peracid solution is sufficiently free of water to permit good yields of epoxide products, and the resin catalyst does not interfere with the formation of the epoxide compounds.

The following examples will serve to illustrate the invention, however, it should be understood that the invention is not intended to be limited thereby. In these examples, several different types of unsaturated organic compounds were epoxidized using both a wet acid form and a dehydrated acid form of a cation exchange resin. The compounds which were epoxidized included those that are slightly hydrophobic, as well as those that are more highly hydrophilic. Proportions expressed are parts by weight unless otherwise indicated.

In these preparations, cation exchange resins of the sulfonated styrene-divinylbenzene copolymer type, such as the Dowex 50 (Dow Chemical Company) and Amberline IR–120 (Rohm & Haas Company) are first converted to the wet acid form. The resin is washed several times with 4 to 6 normal hydrochloric acid. The product is then washed with distilled water to remove excess mineral acid and inorganic salt, and air-dried to yield a wet acid form of the cation exchange resin. A dehydrated form of the resin was prepared by warming the wet acid form in a vacuum oven at temperatures of about 80° C. for a period of approximately 16 hours.

Example I illustrates the use of a wet acid form of cation exchange resin, and the use of a dehydrated acid form of cation exchange resin in the epoxidation of unsaturated compositions which tend to be slightly hydrophobic.

Example 1

In a 3-neck flask provided with a thermometer, a mechanical agitator, a reflux condenser, and a dropping funnel for addition of materials was placed 107 parts of a wet acid form of the cation exchange resin Dowex 50 X–8 (50–100 mesh, Dow Chemical Company, a copolymer containing about 8% divinylbenzene) and 30 parts of glacial acetic acid. To this mixture was added 286 parts of butyl oleate in an equal weight of xylene. To the continuously agitated reaction mixture was added dropwise over a period of 36 minutes 75 parts of 50% hydrogen peroxide. The reaction temperature was held at 60° C. requiring the application of some external heat. The reaction was continued at 60° C. until a milliliter sample of the reaction mixture analyzed less than 1 milliliter of .1 normal sodium thiosulfate in an iodometric determination of hydrogen peroxide. The product was then filtered, finally pressing the cation exchange resin filter cake. The product had an epoxide equivalent, or equivalent weight to epoxide group, of 390.

The epoxide values as discussed herein were determined by refluxing for 30 minutes a 2-gram sample with 50 milliliters of pyridine hydrochloride in excess pyridine. After cooling to room temperature, the sample is then back-titrated with standard alcoholic sodium hydroxide.

The same preparation was repeated save that the wet exchange resin was dehydrated by placing it in a vacuum oven at 85° C. for 16 hours, and the mixture of glacial acetic acid and exchange resin was allowed to stand until the resin had completely taken up the acid prior to the addition of butyl aleate. The product had an epoxide equivalent of 356. It will be seen that this epoxide value is in the same range as that obtained with the wet acid form of resin.

Example II illustrates the use of a wet acid form of a cation exchange resin, and the use of a dehydrated cation exchange resin in the epoxidation of unsaturated compositions which tend to be slightly hydrophilic.

Example II

A typical alkyd resin was prepared as follows: To a kettle provided with a condenser was added 290 parts of white refined soyabean oil. While bubbling a continuous stream of nitrogen through this oil, the temperature was raised to 250° C. at which temperature 0.23 part of litharge was added and the temperature held at 250° C. for 5 minutes. While holding the temperature above 218° C., 68 parts of technical pentaerythritol was added, after which the temperature was raised to 238° C. and held until a mixture of 2½ parts of the product and 1 part of methyl alcohol showed no insolubility (about 15 minutes). At this point 136 parts of phthalic anhydride was added and the temperature gradually raised to 250° C. and held at this temperature for 30 minutes. The condenser was then removed from the kettle and the pressure reduced somewhat by attaching a water aspirator evacuating system. With continuous agitation the mixture was then held at 250° C. until the acid value had reached 10.5. Acid value as herein described represents the number of milligrams of KOH equivalent to the acidity present in a one-gram sample. At this point the resin was thinned with xylene to 48% nonvolatile content having a Gardner Bubble viscosity of H.

This alkyd resin was then epoxidized with an anhydrous cation exchange resin as follows: In a 3-neck flask provided with a thermometer, a mechanical agitator, and a reflux condenser was placed 70 parts of a dehydrated acid form of a cation exchange resin (Dowex 50 X–8) and 15 parts of glacial acetic acid. The mixture of cation exchange resin and acetic acid was allowed to stand until the resin had completely taken up the acid. To this mixture was added 315 parts of the alkyd resin solution described above and 190 parts of xylene. To the continuously agitated reaction mixture was added dropwise 38 parts of 50% hydrogen peroxide. The reaction temperature was held at 60° C. until a milliliter sample of the reaction mixture analyzed less than 1 milliliter of 0.1 N sodium thiosulfate, in an iodometric determination of hydrogen peroxide. The product was then filtered finally pressing the cation exchange resin filter cake. The epoxide equivalents on the nonvolatile contents of three preparations were 451, 483, and 472.

Another sample of the alkyd resin was epoxidized in a similar manner save that the anhydrous resin was replaced with 173 parts of a wet acid form of cation exchange resin (Dowex 50 X–8). This wet resin contained 103 parts of water per 173 parts of wet resin. The epoxide equivalents of three batches prepared in this manner were 598, 998 and 596, larger than when the anhydrous resin was used. Another variation observed in the processing of this alkyd resin with the wet and dry cation exchange resin was that the anhydrous cation exchange resin preparation gave epoxidized resin solutions free from any haziness, whereas the product using the wet cation exchange resin was milky in appearance from emulsified water content.

Example III illustrates the use of a wet acid form of a cation exchange resin, and the use of a dehydrated cation exchange resin in the epoxidation of relatively hydrophilic compositions such as the polyesters of tetrahydrophthalic acid and a glycol.

Example III

A polyester of tetrahydrophthalic acid and a glycol was prepared as follows: In a 3-neck flask provided with a thermometer, a mechanical agitator, and reflux condenser attached through a water trap was placed a mixture of 1.1 mol tetrahydrophthalic anhydride, and 0.2 mol n-butanol. After melting the tetrahydrophthalic anhydride in the presence of the butanol, 1 mol of pentamethylene glycol was added. The reaction mixture was gradually heated with agitation to 225° C. at which point a sufficient amount of xylene was added to give refluxing at esterification temperature. The reaction mixture was then heated with continuous agitation at 225–235° C. until the acid value decreased to below 5. The product was a highly viscous, tacky solid having slight flow at room temperature.

This polyester was then epoxidized with an anhydrous cation exchange resin as follows: In a 3-neck flask provided with a thermometer, a mechanical agitator, and a reflux condenser was placed 107 parts a dehydrated acid form of a cation exchange resin (Dowex 50 X–8, Dow Chemical Company) and 30 parts glacial acetic acid. The mixture of cation exchange resin and acetic acid was allowed to stand until the resin had completely taken up the acid. To this mixture was added 240 parts of the polyester resin dissolved in an equal weight of xylene. To the continuously agitated reaction mixture was added dropwise over a period of 45 minutes to 1 hour 75 parts of 50% hydrogen peroxide. The reaction temperature was held at 60° C. requiring the application of some external heat. In some preparations involving other polyester resins, sufficient exothermic heat is produced during the addition of hydrogen peroxide so that no external heat is required, or even some external cooling may be required. The reaction was continued at 60° C. until a milliliter sample of the reaction mixture analyzed less than 1 milliliter of 0.1 N sodium thiosulfate in an iodometric determination of hydrogen peroxide. The product was then filtered, finally pressing the cation exchange resin filter cake. The acid value of the total resin solution was 30.4. The equivalent weight to epoxide group on the nonvolatile at this stage amounted to 322.6.

When the 107 parts of the dehydrated exchange resin was replaced with a wet acid form of the resin having the same nonvolatile content after dehydration in a vacuum oven, epoxidized polyester resins from three different preparations had epoxide equivalent weights of 3500, 3000, and 1000. The products prepared in the presence of anhydrous cation exchange resins were clear, transparent solutions, whereas the products prepared in the presence of a wet acid form of cation exchange resins contained sufficient water in an emulsified form to give milky products.

From the above, it is apparent that relatively good yields of epoxidation were obtained using either a wet or dehydrated acid cation exchange resin in the epoxidating of organic compounds which are slightly hydrophobic. In the case of organic compounds which are slightly hydrophilic, the epoxide values obtained were considerably higher when the wet acid form of cation exchange resin was used. In all the cases, a clear epoxide composition free of emulsified water was obtained when the peracid solution was formed with a dehydrated cation exchange resin.

While various embodiments of the invention have been described, it should be understood that the invention is not restricted thereto, and that it is intended to cover all modifications of the invention which would be apparent to one skilled in the art and that come within the scope of the appended claims.

It is claimed and desired to secure by Letters Patent:

1. In the epoxidation of a hydrophilic organic compound having an olefinic unsaturated aliphatic portion by reacting at below boiling temperatures mixtures of said compound and a perorganic acid selected from the group consisting of peracetic acid, performic acid and perbenzoic acid, the improvement comprising forming said perorganic acid in situ with said organic compound and simultaneously during the epoxidation reaction, by reacting an organic acid selected from the group consisting of acetic acid, formic acid and benzoic acid with hydrogen peroxide in the presence of a dehydrated sulfonic acid cation exchange resin catalyst.

2. In the epoxidation of a hydrophilic organic compound having an olefinic unsaturated aliphatic portion by reacting at below boiling temperatures mixtures of said compound and peracetic acid, the improvement comprising forming said peracetic acid in situ with said organic compound and simultaneously during the epoxidation reaction, by reacting concentrated acetic acid with an aqueous solution of more than about 50% hydrogen peroxide in the presence of a dehydrated sulfonic acid cation exchange resin catalyst.

3. In the epoxidation of a hydrophilic olefinic unsaturated polyester of tetrahydrophthalic acid and an aliphatic glycol by reacting at below boiling temperatures mixtures of said polyester and peracetic acid, the improvement comprising forming said peracetic acid in situ with said polyester and simultaneously during the epoxidation reaction, by reacting acetic acid with hydrogen peroxide in the presence of a dehydrated sulfonic acid cation exchange resin catalyst.

4. In the epoxidation of a hydrophilic olefinic unsaturated polyester of tetrahydrophthalic acid and an aliphatic glycol by reacting at below boiling temperatures mixtures of said polyester and a perorganic acid selected from the group consisting of peracetic acid, performic acid and perbenzoic acid, the improvement comprising forming said perorganic acid in situ with said polyester and simultaneously during the epoxidation reaction, by reacting an organic acid selected from the group consisting of acetic acid, formic acid and benzoic acid with hydrogen peroxide in the presence of a dehydrated sulfonic acid cation exchange resin.

5. A process in accordance with claim 1 wherein said sulfonic acid cation exchange resin has been thermally dehydrated, the resulting epoxidized organic compound is possessed of a high degree of epoxidation and is not emulsified in the reaction system.

6. A process in accordance with claim 1 wherein said sulfonic acid cation exchange resin catalyst has been thermally dehydrated by heating it to a temperature of from about 75° C. to about 110° C.

References Cited in the file of this patent

UNITED STATES PATENTS

| | | |
|---|---|---|
| 2,337,038 | Reichert et al. | May 29, 1945 |
| 2,490,800 | Greenspan | Dec. 13, 1949 |
| 2,660,563 | Banes et al. | Nov. 24, 1953 |
| 2,919,283 | Greenspan et al. | Dec. 29, 1959 |

OTHER REFERENCES

Ion Exchange Research, article by Kressman (pages 212–219), May 1952.

Findley et al.: J.A.C.S., vol. 67, March 1945, pp. 412–414.